(12) United States Patent
Sikora

(10) Patent No.: US 7,761,245 B2
(45) Date of Patent: Jul. 20, 2010

(54) METHOD FOR VISUALISING THE ECCENTRICITY OF CABLES IN THE ECCENTRICITY MEASUREMENT OF THE CABLES

(75) Inventor: Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 0 days.

(21) Appl. No.: 12/186,285

(22) Filed: Aug. 5, 2008

(65) Prior Publication Data

US 2009/0043532 A1 Feb. 12, 2009

(30) Foreign Application Priority Data

Aug. 11, 2007 (DE) .................. 10 2007 037 963

(51) Int. Cl.
*G06F 15/00* (2006.01)
(52) U.S. Cl. .................. 702/40; 324/230; 324/207.15; 324/262
(58) Field of Classification Search .................. 702/40; 324/230, 207.15, 262–263
See application file for complete search history.

(56) References Cited

U.S. PATENT DOCUMENTS 5,214,376 A * 5/1993 Sikora .................. 324/207.15

OTHER PUBLICATIONS

Centerview 8000, Non contact measuring devices for cable production lines, Sikora technology to perfection, Apr. 2008. (http://www.sikora.net/products/centerview-8000/_pdfs/Product_Brochure/CENTERVIEW_8000.pdf).*

* cited by examiner

*Primary Examiner*—Drew A Dunn
*Assistant Examiner*—Hien X Vo
(74) *Attorney, Agent, or Firm*—Vidas, Arrett & Steinkraus

(57) ABSTRACT

A method for visualizing the eccentricity of cables which is acquired in the eccentricity measurement of the cables, wherein eccentricity measurements take place at the same time on plural locations spaced apart across the perimeter of the cable during the transportation of the cable, and the measurement values are represented graphically on a display after being processed in a computer, characterized in that a frequency distribution of individual eccentricity values acquired during the measurement interval is represented on the display, wherein the scattering caused by measuring instruments is significantly smaller than the scattering of the individual eccentricity values.

11 Claims, 2 Drawing Sheets

METHOD FOR VISUALISING THE ECCENTRICITY OF CABLES IN THE ECCENTRICITY MEASUREMENT OF THE CABLES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

In the production of cables, it is usual to measure the eccentricity, that is, the relative position of the conductor in the cable sheath. The eccentric position of the conductor can mean that in a region of the perimeter, the wall thickness of the sheathing does no more provide sufficient insulation. On the other hand, in the production it is aimed to keep the amount of material per unit length at optimum, that means to avoid too high a consumption of material. An eccentricity measurement determines whether there are displacements of the conductor in the sheathing.

Different methods working with and without contact have become known for the eccentricity measurement in cables. It will not be incurred to the same in more detail.

In particular, cables with smaller diameters are produced with considerably high speed, from some meters per second up to 30 m per second, for instance. An eccentricity measurement is performed in measurement intervals of 1 to 2 seconds, for instance. For instance, some hundred measurement values can be generated in one measurement interval with a non-contact measurement method. In the eccentricity measurement, it is known to perform a measurement on plural locations spaced apart across the perimeter direction of the cable at the same time. In this way, it is possible to determine the eccentricity more accurately with respect to amount and direction. Further, it is known to represent the measurement values graphically, such that the machine operator can recognise an eccentricity and can take suitable countermeasures, as the case may be, for instance by adjusting the extruder tool. In the known method, the measurement values of a measurement interval are averaged. In doing so, it has been proven in an optical examination that samples have eccentricities which could not be recognized in the graphic representation.

The present invention is based on the objective to provide a method for visualising measurement values in the eccentricity measurement of cables, which makes an eccentricity visual in a graphical representation even at rapid fluctuations of the eccentricity values.

BRIEF SUMMARY OF THE INVENTION

In the method of the present invention, a frequency distribution of individual eccentricity values acquired during a measurement interval is represented on the display. A precondition is that the scattering of the measurement values caused by the measurement instrument is significantly smaller than the scattering of the determined individual eccentricity values.

In the invention, it was recognised that frequently even rapid eccentricity fluctuations occur which do not lead to an indication thereof in the averaging of the eccentricity values according to the known method. As a consequence, the invention proceeds from a processing of individual eccentricity values and visualises a frequency distribution of individual values, preferably in a coordinate system which also appears in the display.

There are different possibilities to represent the frequency distribution according to the present invention. On of them provides that a frequency distribution, the standard deviation for instance, is represented as a circle area, wherein the radius is a measure for a frequency, the standard deviation for instance, while the position of the centre point of the circle with respect to the zero point of the coordinate system is a measure for the average eccentricity according to amount and direction. Finally, even a plurality of circles may be represented, wherein the diameter of the circles defines one other frequency distribution at a time. In addition, the circle lines may have different colours in order to make the different frequency distributions more discernible from each other. For the rest, a circle representation visualises that the individual eccentricity values are distributed around the centre point of the circular area in a statistically uniform way.

A location-correct fade up into the coordinate system on the display of individual eccentricity values in the form of points, corresponding to the respective amount and the direction, across a measurement interval of one or several seconds for instance, permits the generation of an aggregate of points, the density of which is corresponding to the frequency of the distribution of the individual values. A colour change of the represented points can make a frequency distribution for instance outside the standard deviation or another preset frequency distribution of the scattering of the individual values more clearly recognizable.

For instance, when an increased scattering of the individual eccentricity values is situated in one preferred plane, which is caused by an oscillation of the conductor immediately before running into the injection head of the extruder, an area in the form of an ellipse instead of a circle would be imaged. Then, the direction of the major axis of the ellipse corresponds to the eccentricity plane with increased scattering, the distribution of the frequencies corresponds to the distance of the ellipse shaped area from the centre point thereof (from the centre of gravity). The location of the centre point with respect to the zero point of the coordinate system gives information about the average eccentricity according to amount and direction.

A particular form of rapid eccentricity fluctuations is present when a conductor oscillates rotating around its longitudinal axis before running into the extruder. Such an oscillation generates an eccentricity depending on the oscillation amplitude, wherein the direction of the oscillation amplitude circulates with the rotational frequency of the conductor. Even though a continuous eccentricity is present in this, the usual representation by averaging would not permit to recognize the same. Due to the rapid rotation, the representation known in the state of the art is not able to indicate the eccentricity, because the mean value of the rotating individual eccentricity values is located in the centre of gravity of all the individual eccentricities.

A representation of the frequency distribution in a rotating eccentricity of the individual values is possible via a ring-shaped area, for instance. The width of the ring-shaped area corresponds to the frequency of individual eccentricity values in the respective direction, to the standard deviation thereof, for instance. The mean distance of the ring area from its centre of gravity corresponds to the respective mean vector length of the rotating eccentricity vector. The position of the centre of gravity with respect to the zero point of a coordinate system corresponds to the eccentricity of the mean values, across a measurement interval of one second for instance.

An elliptic or oblong shape of the ring indicates that there is a rotation of the eccentricity fluctuation, with an amplitude of the fluctuation width higher in one plane.

With the aid of the present invention, short-time fluctuations of the eccentricity of a cable can be represented in a simple and well arranged form.

BRIEF DESCRIPTION OF THE SEVERAL VIEWS OF THE DRAWINGS

In the following, the present invention is explained in more detail by means of drawings.

DETAILED DESCRIPTION OF THE INVENTION

Figure 1:
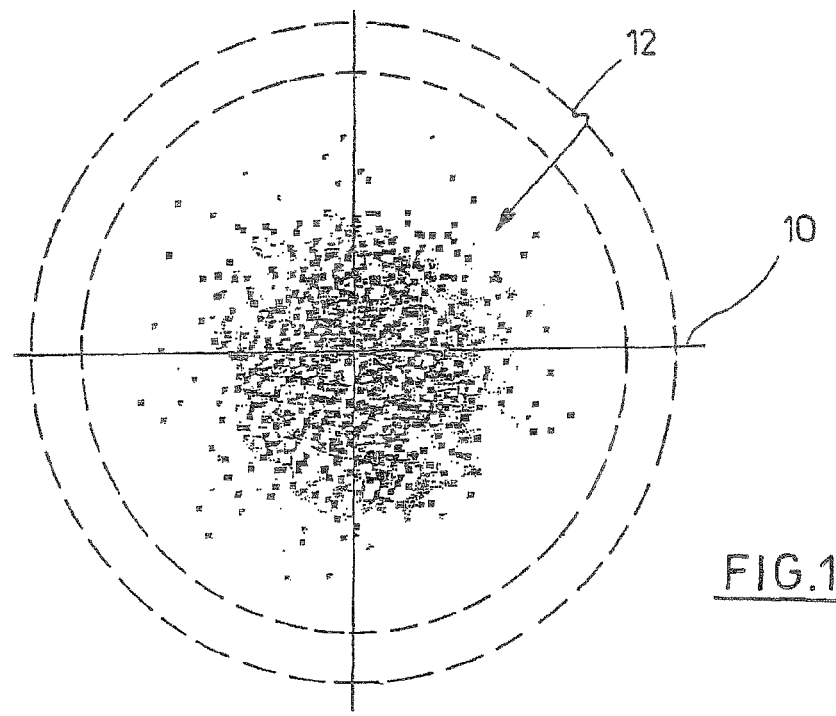
FIG. 1 shows schematically a visualisation of an aggregate of points according to the present invention.

While this invention may be embodied in many different forms, there are described in detail herein a specific preferred embodiment of the invention. This description is an exemplification of the principles of the invention and is not intended to limit the invention to the particular embodiment illustrated In the figures, the display on which the visualisation of eccentricity values takes place is not shown. Only indicated is a coordinate system 10. In FIG. 1, an aggregate of points 12 can be recognized. The aggregate of points consists of measured individual eccentricity points, which are shown as squares here. The individual points are determined in a measurement interval of 1 to 2 seconds for instance, with a plurality of individual measurement processes, of several hundreds e.g. A known eccentricity measuring instrument measures without contact the location of the conductor in a sheathing of a cable generated by an extruder, for instance across the perimeter of the cable on eight points spaced apart at equal perimeter distances. In the ideal case, which exists in theory only, the eccentricity is zero. This would mean that all measurement value points lie essentially in the zero point of the coordinate system, and thus there is concentricity. However, this is not the case in practice; instead there are more or less large scatterings of the eccentricity values in the micrometer range. The greater the eccentricity, the farther apart are the measurement points from the centre point of the coordinate system. In addition, the direction of the measurement points or their location in a quadrant, respectively, indicates in which direction the eccentricity lays.

By statistically processing the individual measurement values in a computer into which the measurement values of an eccentricity measuring instrument are put in, for instance the determination of the standard deviation of the eccentricity values is possible, and with it the representation thereof on the display. The standard deviation or a preset frequency distribution may be represented by a circle for instance, which is laid into the aggregate of points 12 and the centre point of which can lie offset with respect to the zero point of the coordinate system 10. The deviation of the centre point of the circle with respect to the coordinate zero point indicates the amount and the direction of the average eccentricity in the measurement interval.

During the production, the cable moves with a not insignificant speed. The observed measurement interval has only a limited duration in time of 1 to 2 seconds, for instance. However, the eccentricity measurement is performed more or less continuously. The measurement values are continuously put into the computer, wherein according to the advancing speed of the cable, the respective oldest measurements and the respective youngest measurements according to the newly arriving measurement values are highlighted. In this way, the eccentricity is visualised only for a certain length of a cable at a time.

Figure 2:
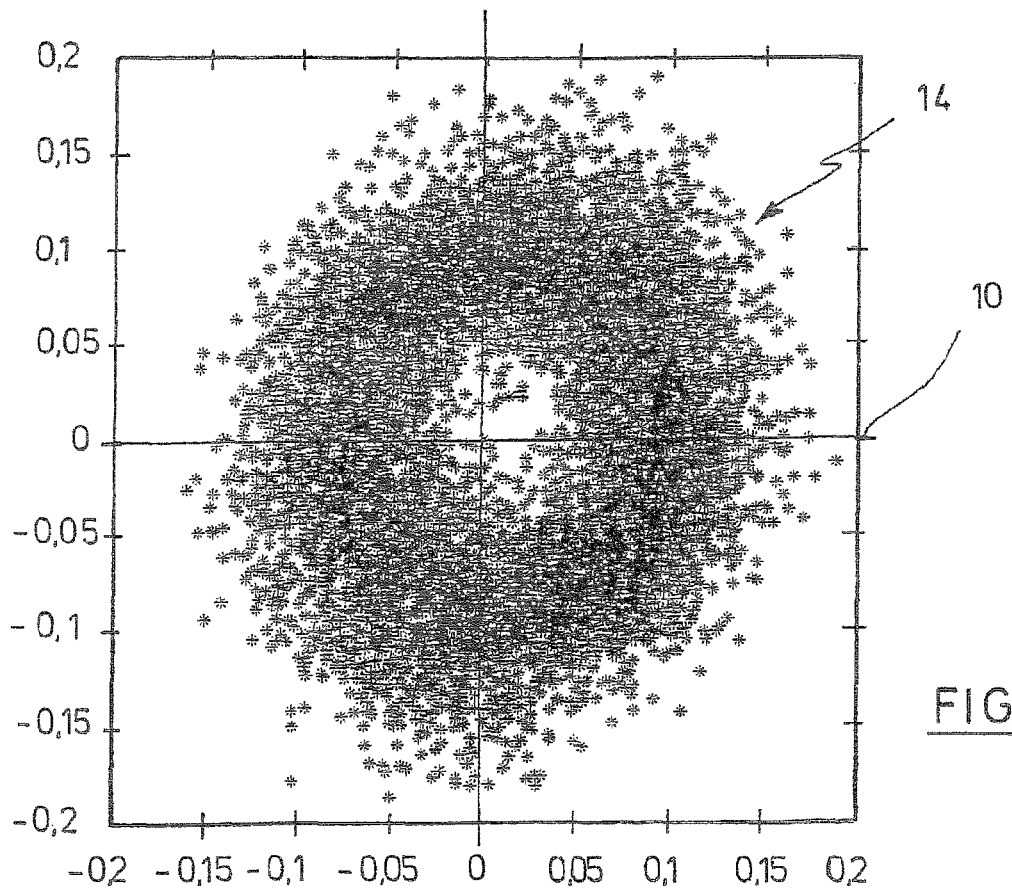
FIG. 2 shows also a visualisation of an aggregate of points, for another case of measurement.

In FIG. 2, a ring-shaped aggregate of points 14 can be recognised in the coordinate system 10. It arises for instance in that the conductor running into the extruder performs a rotation-like oscillation, through which a rotating eccentricity arises when the cable sheathing is applied. On the abscissa and the ordinate, respectively, the amounts of the eccentricity values are plotted.

The ring-shaped aggregate of points permits the user to have an idea about the extent and the location of the eccentricity already at a first glance. It is also possible to put an annular ring into the aggregate of points 14, wherein the thickness of the annular ring corresponds to the frequency of individual eccentricity values in the respective direction, for instance the standard deviation thereof. The mean distance of the ring from its centre of gravity corresponds to the respective mean vector length of the rotating eccentricity vector. The position of the centre of gravity with respect to the zero point of the coordinate system 10 corresponds to the eccentricity of the arithmetic mean values across the measurement interval for instance, across one second for instance.

Figure 3:
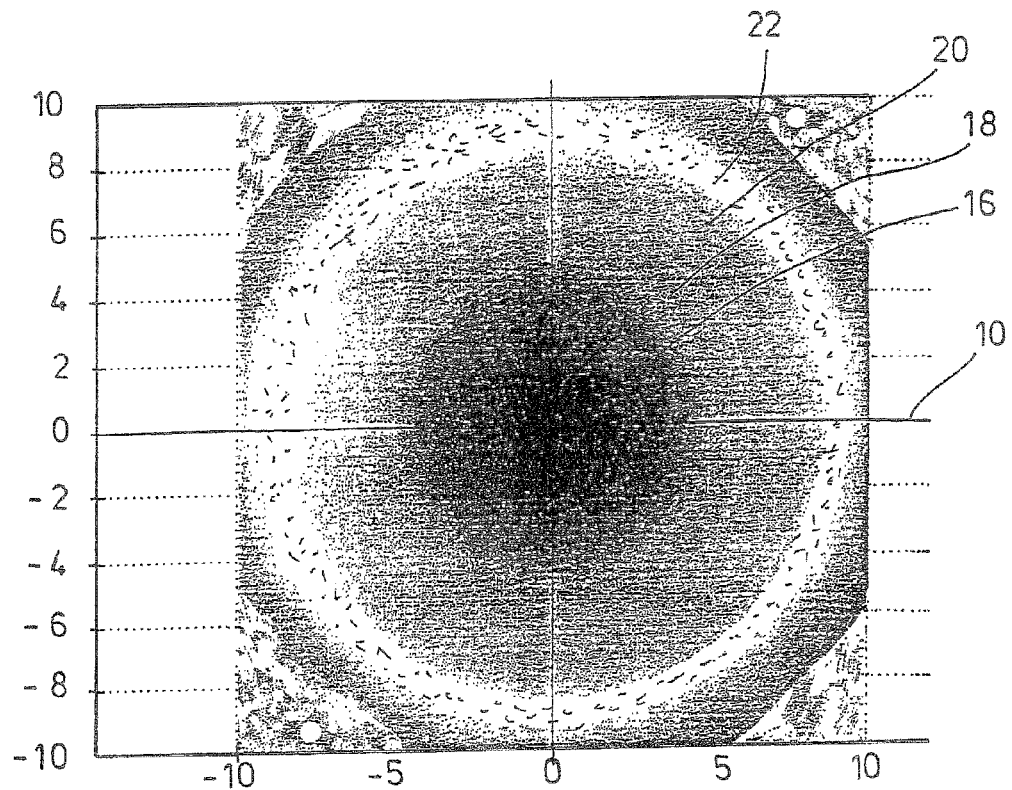
FIG. 3 shows a visualisation as an annular ring with the method of the present invention.

In FIG. 3, a circle area 16 and three concentric ring areas 18, 20, 22 can be recognised. Each of them has different colours. The diameter of the circle area 16 corresponds to the standard deviation of individual eccentricity values during one measurement interval, for instance. The circle area is acquired by a plurality of individual eccentricity values. The ring areas 18-22 correspond to further frequency distributions. In the shown case, the centre of gravity of the circle area and of the ring areas 18-20 is in the zero point of the coordinate system. In case that this is not the case, the mean distance of a ring from its centre of gravity is corresponding to the respective mean vector length of the eccentricity vector, wherein the location of the centre of gravity with respect to the zero point of the coordinate system 10 corresponds to the average eccentricity in the measurement interval in its amount and direction. Even with this representation, the operator of a production plant is able to recognise the eccentricity of the cable even at rapid fluctuations of the eccentricity, in order to start corresponding countermeasures.

Figure 4:
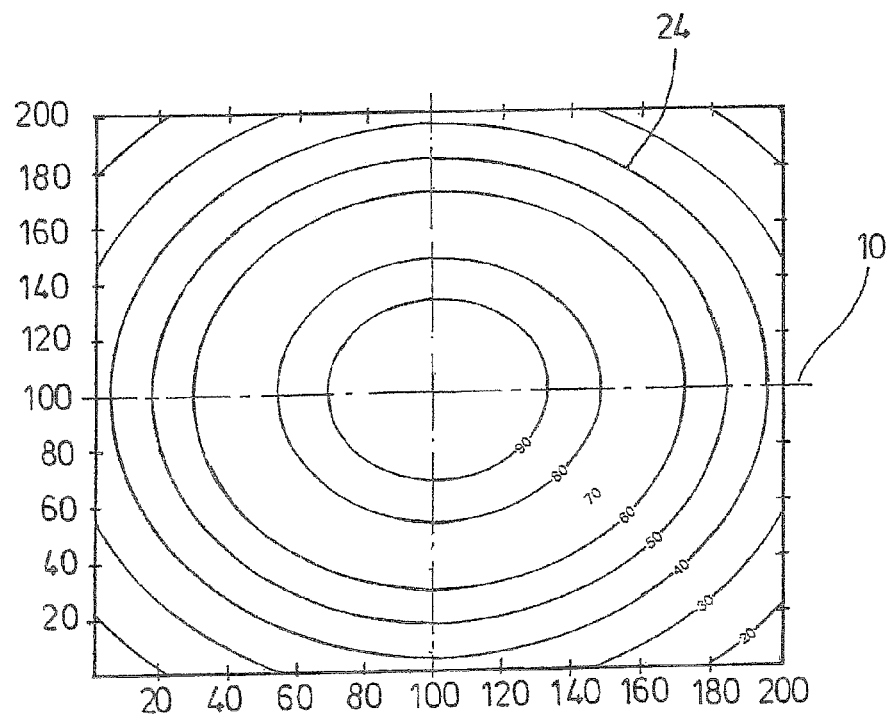
FIG. 4 shows an elliptic visualisation with the method of the present invention.

In FIG. 4 is represented a plurality of ellipses 24 in a coordinate system 10. The ellipse perimeters may have different colours respectively. Line-shaped frequency distributions of the individual measurement values in the eccentricity measurement result in an ellipse when there is an increased scattering of the individual eccentricity values in one preferred plane. For instance, the conductor of the cable may oscillate in a plane vertical to the conductor axis before entering into the extruder. Then, the direction of the major axis of the individual ellipses 24 corresponds to the eccentricity plane of increased scattering. The distribution of the frequencies corresponds to the distance of the ellipse lines 24 from the centre point thereof (the centre of gravity). The position of the centre point with respect to the zero point of the coordinate system gives information about the average eccentricity, as was already described.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for visualizing the eccentricity of cables which is acquired in the eccentricity measurement of the cables, comprising the steps of:
    measurements take place at the same time on plural locations spaced apart across the perimeter of the cable during the transportation of the cable, and the measurement values are represented graphically on a display after being processed in a computer, characterised in that a frequency distribution of individual eccentricity values acquired during the measurement interval is represented on the display, wherein a scattering caused by measuring instruments is significantly smaller than the scattering of the individual eccentricity values.

2. A method according to claim 1, characterised in that the frequency distribution of the individual eccentricity values for a preset cable length or for a preset time interval is represented during the continuous transportation of the cable.

3. A method according to claim 1, characterised in that the frequency distribution is visualized in a coordinate system.

4. A method according to claim 1, characterised in that a frequency distribution is represented as a circle area, wherein the diameter of the circle corresponds to a frequency distribution, while the position of a center point of the circle with respect to a zero point of the coordinate system is a measure for an average eccentricity according to amount and direction.

5. A method according to claim 1, characterised in that the frequency distribution is represented as an ellipse area, wherein the distribution of the frequency corresponds to the distance of an ellipse perimeter from the center point of the ellipse, and a direction of the major axis of the ellipse represents the eccentricity values of increased scattering and the position of the center point of the ellipse with respect to the zero point of the coordinate system represents the average eccentricity according to amount and direction.

6. A method according to claim 1, characterised in that the frequency distribution is represented as an annular ring, wherein the width of the ring corresponds to the frequency of the eccentricity values in the respective direction, the mean distance of the ring area from the rings center of gravity corresponds to the mean vector length of the rotating eccentricity vector and the position of the center of gravity of the ring with respect to the zero point of a coordinate system corresponds to the eccentricity of mean values.

7. A method according to claim 1, characterised in that the individual eccentricity values are represented as an aggregate of points.

8. A method according to claim 7, characterised in that the points situated outside a preset frequency distribution have another color than the points situated inside the frequency distribution.

9. A method according to claim 7, characterised in that one or plural circles or ellipse lines are drawn in the aggregate of points, which correspond to a preset frequency distribution of the measuring points of the aggregate of points.

10. A method according to claim 4, characterised in that plural frequency distributions are represented in a corresponding number of circle lines or ellipse lines, the radius of which indicates the respective frequency distribution.

11. A method for visualizing the eccentricity of cables which is acquired in the eccentricity measurement of the cables, comprising the steps of:
    taking eccentricity measurements at the same time on plural locations spaced apart across the perimeter of the cable during the transportation of the cable;
    representing the measurement values graphically on a display after being processed in a computer;
    representing a frequency distribution of individual eccentricity values acquired during the measurement interval on the display, wherein a scattering caused by measuring instruments is significantly smaller than the scattering of the individual eccentricity values, and
    wherein the frequency distribution displayed is represented in a manner selected from the group consisting of:
    a circle area, wherein the diameter of the circle corresponds to a frequency distribution, while the position of a center point of the circle with respect to a zero point of the coordinate system is a measure for an average eccentricity according to amount and direction;
    an ellipse area, wherein the distribution of the frequency corresponds to the distance of an ellipse perimeter from the center point of the ellipse, and a direction of the major axis of the ellipse represents the eccentricity values of increased scattering and the position of the center point of the ellipse with respect to the zero point of the coordinate system represents the average eccentricity according to amount and direction, and
    as an annular ring, wherein the width of the ring corresponds to the frequency of the eccentricity values in the respective direction, the mean distance of the ring area from the rings center of gravity corresponds to the mean vector length of the rotating eccentricity vector and the position of the center of gravity of the ring with respect to the zero point of a coordinate system corresponds to the eccentricity of mean values.

* * * * *